UNITED STATES PATENT OFFICE.

CHARLES E. BARGLEBAUGH, OF DALLAS, TEXAS.

CONCRETE COMPOSITION.

1,287,827.     Specification of Letters Patent.     Patented Dec. 17, 1918.

No Drawing.     Application filed March 20, 1918. Serial No. 223,568.

*To all whom it may concern:*

Be it known that I, CHARLES E. BARGLEBAUGH, a citizen of the United States, and a resident of Dallas, in the county of Dallas and State of Texas, have invented certain new and useful Improvements in Concrete Compositions, of which the following is a specification.

My invention relates to improvements in compositions of matter, more especially to a concrete composition, and it consists in the product hereinafter described and claimed.

An object of my invention is to provide a concrete which has great strength in comparison with its weight, or in other words, a concrete which is relatively light.

A further object of my invention is to provide a concrete composition which may be economically made, due to the fact that one of the main ingredients is found in vast quantities in certain parts of the country.

A further object of my invention is to provide a concrete of a dark color due to the use of crushed rock and aggregate of volcanic origin known as lava rock, without any addition of coloring matter.

A further object of my invention is to provide a concrete construction in which the use of ordinary sand is dispensed with.

Other objects and advantages will appear in the following specification and the novel features of the invention will be particularly pointed out in the appended claims.

In carrying out my invention I make use of lava rock which is found in large quantities in the western part of the United States and in the southwestern part as well. This lava rock is of a basaltic nature and contains a high proportion of silica. It exists in large masses and has the appearance of honey-comb, being formed of numerous cells due to the action of the volcanic gases. The rock itself is relatively light and is easily crushed on account of its porous construction.

In preparing the concrete, I first crush this rock and then grind it, preferably to 100 mesh. The ground rock may then be screened and the screened material is used in lieu of the sand of the ordinary concrete.

I prefer to use as aggregate, pieces of the rock itself. These are crushed to small pieces of the size of approximately one inch in diameter. The proportions of cement, ground rock and aggregate are preferably— 1 of cement, 1½ of ground rock and 3 parts of aggregate, although of course the concrete may be made of other proportions without departing from the spirit or scope of the invention. The concrete is formed by mixing these ingredients and treating with water in the ordinary way, after which the wet mass is allowed to set.

A concrete formed in the manner described and of the ingredients mentioned has very valuable properties. It weighs approximately 110 lbs. per cubic foot as against 150 lbs. per cubic foot of ordinary concrete. The breaking strength of ordinary concrete is substantially 2400 lbs. per square inch, that is to say under compression, while with the concrete which forms the subject of this invention the breaking strength is 2600 lbs. The tensile strength of the ordinary concrete is 190 lbs. as against 212 lbs. of the concrete formed as described above.

The concrete does not require coloring matter in order to make a dark gray concrete, such as that used for pavements and the like. The ordinary concrete does require coloring matter in order to obtain a wall or pavement which is dark gray. My concrete is waterproof, whereas the ordinary concrete is not.

Another feature to which I desire to call attention is that the ground rock consists of small particles which are sharp and which therefore readily adhere to the cement. In this, the ground rock differs from the very fine sand, since the latter is generally smooth and will not form a strong concrete. The concrete formed with the lava rock has a relatively low absorption due to its waterproof qualities.

I claim:—

1. A concrete composition comprising a mixture of cement, ground lava rock of substantially 100 mesh fineness, and aggregate, in substantially the following proportions, 1 of cement, 1½ of ground rock and 3 parts of aggregate.

2. A concrete composition comprising a mixture of cement, ground lava rock of substantially 100 mesh fineness, and aggregate, in substantially the following proportions, 1 of cement, 1½ of ground rock and 3 parts of aggregate, said aggregate comprising pieces of the size of approximately one inch in diameter.

CHARLES E. BARGLEBAUGH.

Copies of this patent may be obtained for five cents each, by addressing the "Commissioner of Patents, Washington, D. C."